Oct. 7, 1952   B. SZCZENIOWSKI   2,612,755
ROTARY HYDRAULIC TORQUE CONVERTER
Filed March 20, 1947   4 Sheets-Sheet 1
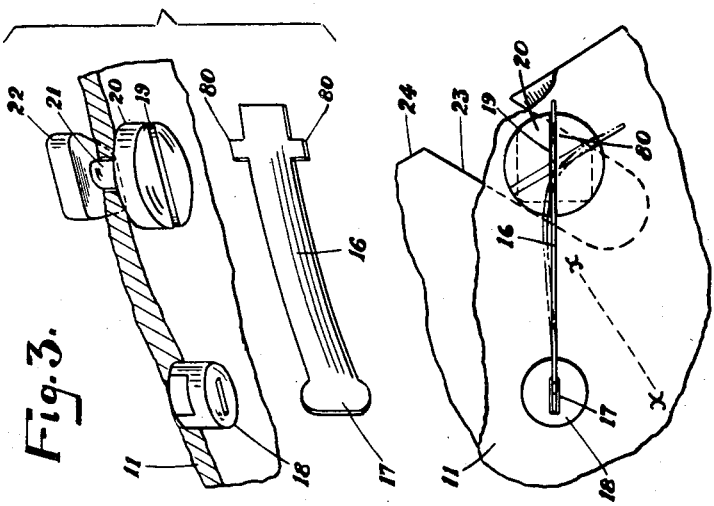
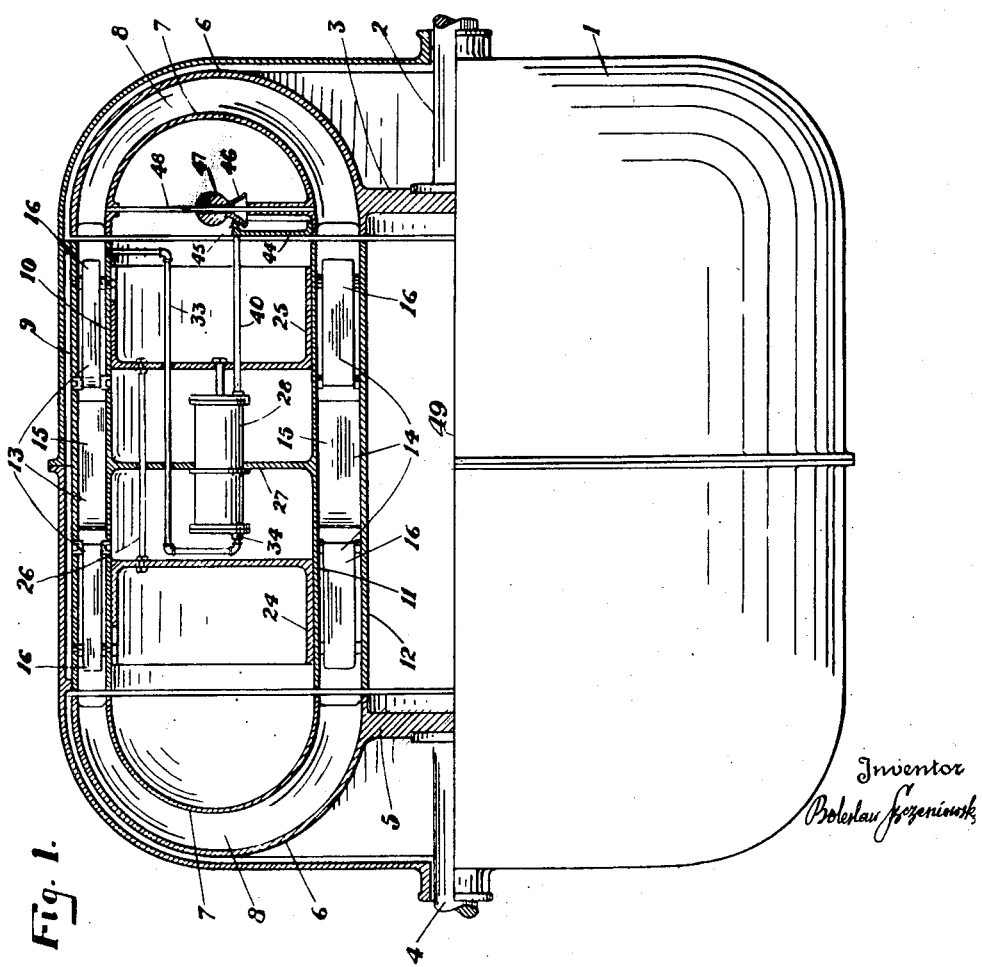
Inventor
Boleslau Szczeniowski

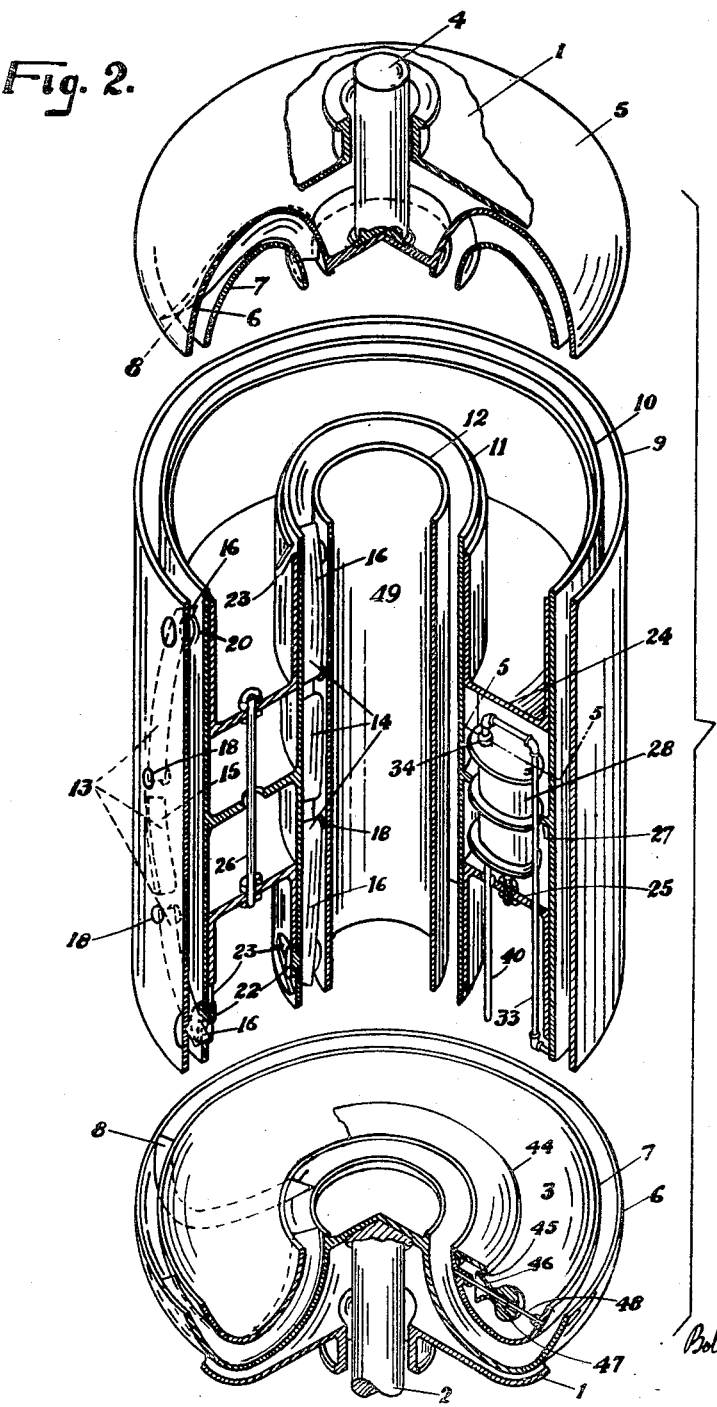

Oct. 7, 1952  B. SZCZENIOWSKI  2,612,755
ROTARY HYDRAULIC TORQUE CONVERTER
Filed March 20, 1947  4 Sheets-Sheet 4

INVENTOR
B. Szczeniowski

UNITED STATES PATENT OFFICE

2,612,755
ROTARY HYDRAULIC TORQUE CONVERTER

Boleslaw Szczeniowski, West Montreal, Quebec,
Canada

Application March 20, 1947, Serial No. 736,086
In Canada April 10, 1946

1 Claim. (Cl. 60—54)

My invention relates to improvements in hydraulic power transmission of the kind of a hydraulic torque converter, in which the conversion of torque and speed is effected by means of two bladed rotors: pump impeller, driven by any kind of engine (internal combustion, steam, electric, etc.), and turbine runner, driving the secondary shaft, while being rotated by reaction with a fluid pumped by the pump impeller. The primary shaft, on which the pump impeller is mounted, will be termed in the following as driving shaft, in respect to the transmission as described; consequently, the secondary shaft, carrying turbine runner, will be termed driven shaft.

As is known, the two principal groups of hydraulic losses occurring in fluid motion throughout hydraulic transmission are: (a) friction loss and vortexes in the flowing stream, and possibly also shocks, if abrupt changes of direction of flow, discontinuities of cross-section, dead zones, etc., occur in the channel; (b) hydrodynamic shock loss, occurring at every passage from one bladed element to the other, and due to the abrupt change in the direction of velocity vectors. There are four such passages in a transmission composed of two running elements: at the pump exit, at the turbine inlet, at the turbine exit, and, finally, at the pump inlet.

Friction loss and vortexes in the flow may be reduced to a minimum by having inner channel wall surfaces as smooth as feasible and, which is more important, by employing a geometrical form of channel as smooth and slanting as possible along the whole path traversed by the working fluid. Thus, any fluid passage should be made as gradual as possible; abrupt changes of the cross-section and sharp angles in the channel form should be avoided; abrupt changes of direction of flow and dead zones in it should be eliminated.

It is known both from theoretical investigation and from experience that shock loss is much more important than friction loss. On the other hand, it is more difficult to avoid, because it depends on many factors such as the primary speed, the ratio of primary to secondary speed, the ratio of primary to secondary torque, etc., all these factors being variable with the operating conditions of the torque converter. If all blades, in rotors and in stators as well, are rigid, the angles of blade ends at the four above-mentioned passages may be chosen so as to avoid any shock loss in one specific case only, i. e. under one given group of operating conditions (speeds, torques, etc.). If any one of the parameters involved is altered, these angles cease to be correct and should be adjusted, according to careful study of changes in the velocity triangles, this being necessary at any of the said four main points of the flow path.

Generally speaking, the role of stationary guide (or guides) in a hydraulic torque converter is twofold. First, it is the question of imparting a certain moment of momentum to the fluid in order to increase the secondary torque beyond the value of the primary torque. Second, is the question of forcing the fluid to leave or enter the consecutive bladed elements of a converter at angles such as are necessary to avoid shock losses. To increase the secondary torque, one stationary guide (placed either between pump exit and turbine inlet or between turbine exit and pump inlet) is, in principle, sufficient. So far as shock losses are concerned, stationary guides may be avoided if the blade ends either in pump or in turbine, are adjustable. Unfortunately, such a control of blades which are in motion is too complicated for practical purposes, also too heavy and expensive, and not satisfactory as to results. In addition, theoretical analysis proves that this kind of blade control is ineffective from the viewpoint of physical phenomena.

Thus, to obtain a fully correct solution, an alternative remains: to apply two stationary bladed guides, one between pump exit and turbine inlet, and the other between turbine exit and pump inlet, all the four blade ends in these two stationary guides being adjustable.

So far as friction loss and vortexes are concerned, as well as any possible shock loss within the channel formed by the adjacent blades of any bladed element of the converter, it is obvious that the system of blades, each being rigid but pivoting on a certain axis, has to be rejected. The alternative is to introduce flexible blades, i. e. blades both ends of which are made of flexible material, such as for instance spring steel sheet of constant or variable thickness. Such blades will be able to bend and change positions at their ends without creating any sharp angle along their length. One of the possible solutions is shown in Fig. 4 as an example. Of course, any other suitable solution known from practice may also be applied.

A further object of my invention is the application of an automatic blade control by means of oil pressure as obtained at pump exit for instance. As is known, the pressure of the working fluid (e. g. oil) is a function of the slip, i. e. of the difference between primary and secondary speeds (or their ratio). With increasing slip the pressure decreases while the oil circulation increases. On the other hand, the four blade angles to be adjusted are also functions of the slip. We, therefore, can establish the relation between the oil pressure and the blade angles desirable under any operating conditions, and can apply a control unit as shown, for instance, in Fig. 5, in which the controlling device itself influences the blades to be controlled not directly but through a servo-motor. The force delivered by this servo-motor to act upon the blades may be, of course, chosen as great as is necessary to assure an exact response of the blades to the given oil pressure, whatever may be the resistance of the blades to bending.

Still another object of my invention is the application of double blade control. The control by means of oil pressure is valid only in the case of some given primary speed, which remains constant. But in many practical cases, for instance in automobiles, this speed has to be variable within wide limits. On the other hand, oil pressure is the function not only of the slip but also of the primary speed. Therefore, I introduce a centrifugal regulator (as shown in Fig. 1) whose aim is to act on the tension of spring 41 in control unit represented in Fig. 5, in order to counterbalance the effect of changes in oil pressure due to variations in primary speed.

Such a double automatic control enables us to maintain a very high value of efficiency both for every chosen speed ratio (i. e. slip) and for every value of primary speed. This is proved by theoretical computations based on hydrodynamic theory of my torque converter; the results are illustrated in Fig. 6.

So far as the secondary torque is concerned, its increasing has to be quick enough with the growing slip in order to have a good acceleration. Furthermore, its value at full slip (i. e. at starting) must be high enough, not less than five times the primary torque. Both of these conditions can be easily fulfilled in my hydraulic torque converter by a suitable choosing of fixed blade angles in the two runners (pump and turbine), as results from the theory of my torque converter. In addition, there is a connection between the starting secondary torque and the quality of the efficiency curve as shown in Fig. 6; the better this latter, the greater the former. The efficiency curve of my torque converter is, of course, actually very good, thanks to the continuous and automatic control of blade angles. Actually, the starting secondary torque in my hydraulic transmission is of the order of 5.6 times the primary torque, which is enough to eliminate the necessity of any combinations with mechanical devices such as gear-box, free-wheel, mechanical coupling, etc., or combinations with other hydraulic units. It is also to be observed, in addition, that, at the direct drive (with minimum slip) the efficiency of my converter is sufficiently high, being comparable with that of fluid coupling, while the shortcomings of the latter are avoided. The final result is a one-stage, purely hydraulic, transmission of great simplicity and automatic operation showing absolute smoothness in continuously variable transmission of speed and torque.

In the drawings:

Fig. 1 is a side elevational view, partially in section, of a hydraulic power transmission constructed according to my invention;

Fig. 2 is an exploded perspective view, partially broken away, of the unit as shown in Fig. 1;

Fig. 3 is an enlarged, detail, perspective, exploded view of part of one of the flow-directing blades of my transmission unit and the cam-operating mechanism therefor;

Fig. 4 is an inverted plan view of the detail shown in Fig. 3;

Like characters of reference designate corresponding parts in the different views.

Figure 5:
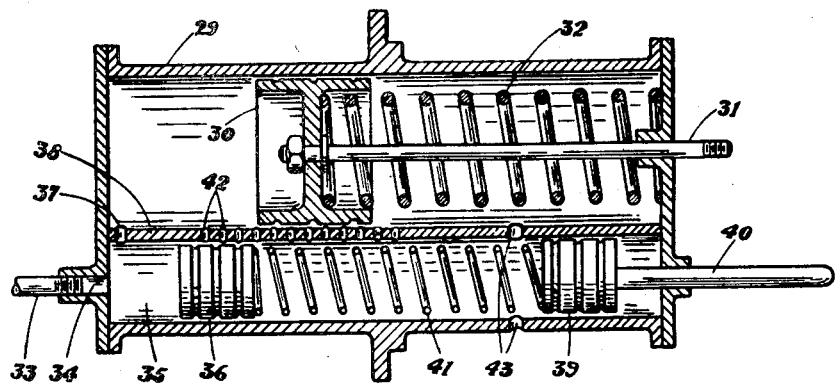
Fig. 5 is an enlarged cross-sectional view of a hydraulic control mechanism taken on the line 5—5 of Fig. 2.
Figure 6:
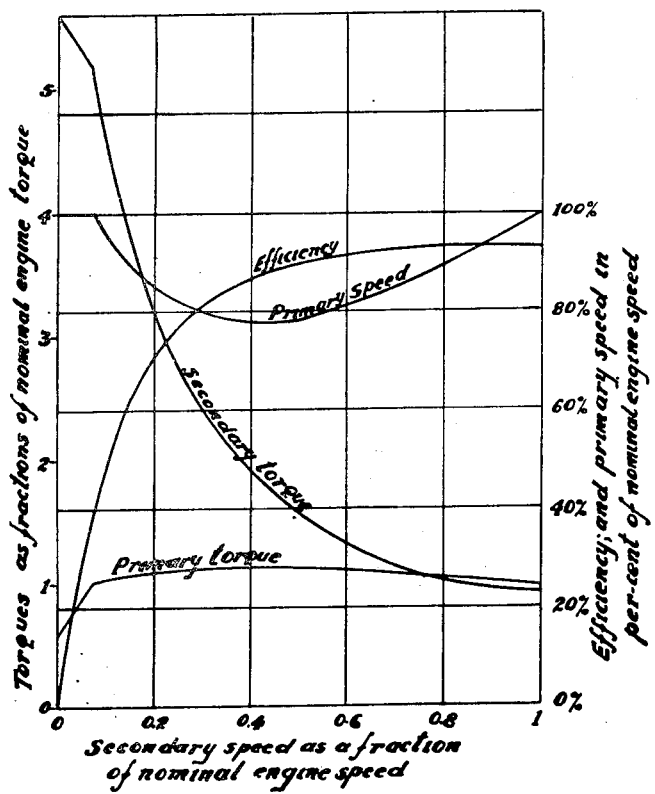
Fig. 6 is a chart indicating graphically the operating characteristics of a hydraulic power transmission constructed according to my invention.

The operation of my hydraulic transmission is as follows:

In casing 1 are journalled driving shaft 2 carrying a pump impeller 3, and a driven shaft 4 carrying a turbine runner 5. As illustrated, both these rotors are of what might be described as hemi-toroidal shape, having a pair of spaced shells 6 and 7 with rigid vanes 8 therebetween. The interior of casing 1 is filled with oil or other hydraulic fluid. Sleeves 9 and 10, rigidly secured in casing 1, form an annular hydraulic fluid passage from the outer periphery of pump impeller 3 to the outer periphery of turbine runner 5, and sleeves 11 and 12 form an annular fluid passage from the inner periphery of turbine runner 5 to the inner periphery of pump impeller 3.

The oil passing through pump 3 between a set of rigid blades 8 (only two of them shown in Fig. 2) increases its velocity and pressure and passes to the stationary guide composed of a plurality of adjustable blades 13, fixed blades 15 and adjustable blades 13 (only one of each shown in Fig. 2), which communicate to the oil some amount of reaction torque. In turbine 5 the velocity and pressure of the oil passing between a set of rigid blades 8 (only one of them shown in Fig. 2) drop, giving impulsion to the blades. The energy is then transmitted to the output (driven) shaft 4, from which the output power is taken. Space 49 plays the role of oil reservoir (the auxiliary oil pump, necessary to assure a complete filling of the oil flow duct and to avoid cavitation, is not shown, as it may be regarded as a known, conventional device). The oil then passes through the other stationary guide consisting of a plurality of adjustable blades 16, fixed blades 14, and adjustable blades 16 (only one of each shown in Fig. 2), which communicate to the fluid some amount of positive or negative reaction torque. Finally the oil returns to pump impeller 3.

The adjustable blades are intended to act as single flexible units, but in actual construction each blade consists of a fixed portion 15 rigidly secured between sleeves 9 and 10 and flexible portions 16. As best illustrated in Figures 3 and 4, flexible portions 16 of blades 13 and/or 14 are made of spring steel or some other readily bendable material and are fixed at one end 17 in bosses 18 non-rotatably secured, one in each of the sleeves 9 and 10 in the case of blades 13, and one in each of sleeves 11 and 12 in the case of blades 14, while the other end of portion 16 of the blades is provided with ears 80, one of which slides in a blind slot 19 in the disc-like head 20 of a cam element rotatable on shank 21 passing through one of sleeves 10 or 11 and terminating in a cam 22, and the other ear of which slides in the slotted disc-like head 20 of a similar element without a cam. Cams 22 are actuated by cam slots 23 in one or the other of a pair of cam sleeves 24 and 25, respectively, which are rigidly secured together to be movable as a unit longitudinally of the transmission unit by means such as tie rods 26, of which only one of a number is shown in the drawing. Thus far it will be noted that when sleeves 24 and 25 are moved as a unit longitudinally of the transmission unit, in which case the motion of cam sleeve 24 as shown in Fig. 4 is along the line $x$—$x$ of that figure, in effect the ends, i. e. portions 16, of the blade will be flexed out of the normal center line of the blades, and that cam slots 23 in the inner and outer portions of sleeves 24 and 25 respectively are set at opposite angles so that the extremities of blades 14 are flexed in the opposite direction to the extremities of blade 13. Thus, moving the rigidly-connected sleeves 24 and 25 as a unit, longitudinally of the axis of the transmission, causes blades 13 and 14, which divide the annular space between sleeves 9 and 10 and 11 and 12 respectively into a number of flow paths, to flex uniformly out of a more nearly straight shape to a more curved shape, or vice versa.

Figure 7:
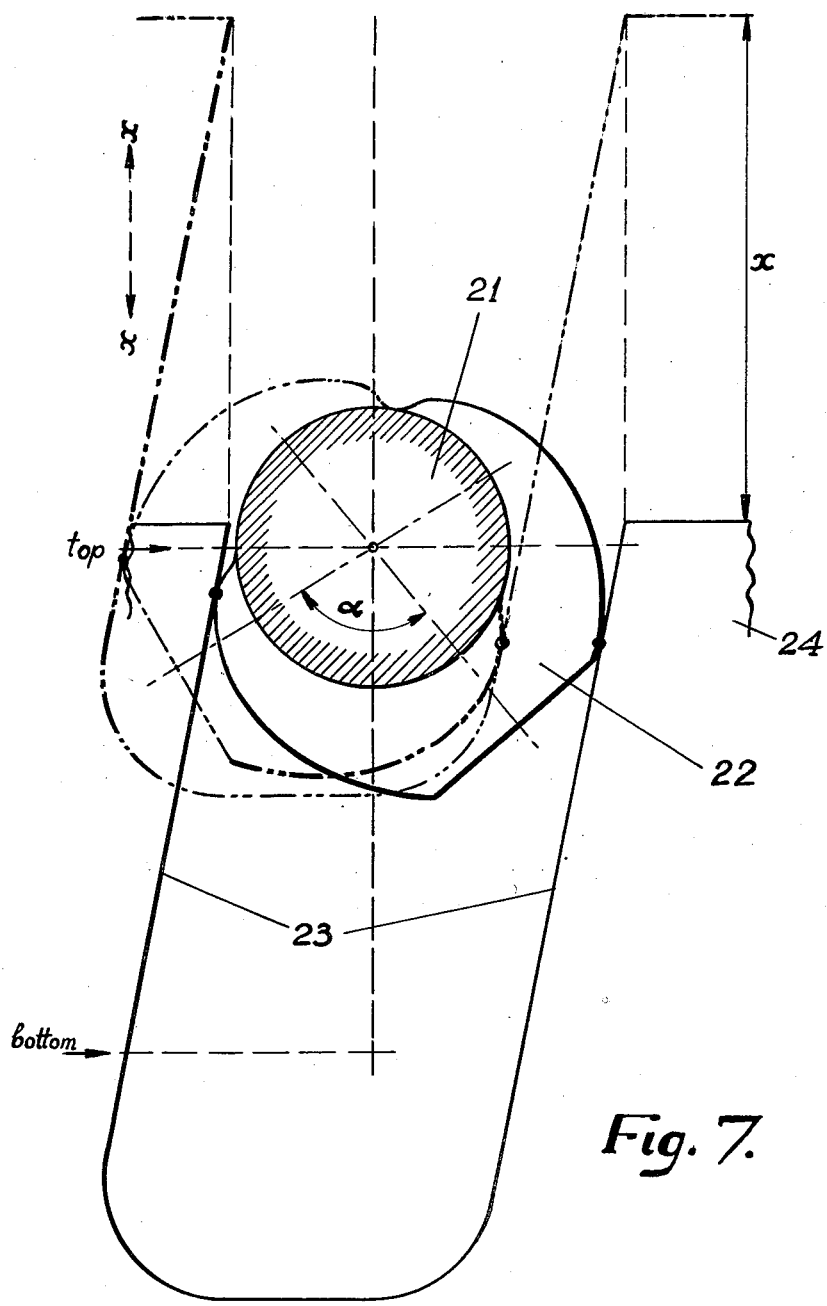
Fig. 7 is a plan view of a cam, serving to adjust blade angles of stationary guides, as placed in a slot made in sleeve, the displacement of which causes the cam to rotate.

The form of cam 22 is chosen so as to have correct blade angle changes in function of the position of sleeves 24 or 25, i. e. in function of the pressure difference in the control unit, this latter being described in greater detail below. In Fig. 7 an example of a form of cam 22, as placed in slot 23 of sleeve 24 is shown in one opsition in full lines and in another position in dotted lines. As is seen, after sleeve 24 has been moved in the direction $x$—$x$ to a distance $x$, cam 22 was forced to turn at an angle $a$, this latter being dependent only on the cam form, if inclination of slot 23 to the direction $x$—$x$ is given. Thus, disc-like head 20 of the cam element was turned also, causing blade 16 to bend at the same angle.

In considering the operation of sleeves 24 and 25 as a unit, it should be noted that sleeves 9 and 10 and 11 and 12, respectively, are rigidly secured in the transmission housing as, for example, by having sleeve 9 secured to the outer casing 1 of the transmission and sleeve 10 secured to sleeve 11 by an integral web 27, and sleeve 12 rigidly secured to sleeve 11 by making blade sections 15 between the two sleeves integral with the sleeves.

The flexing of blades 13 and 14 at the desired angle, in accordance with the operating requirements of the transmission, is effected by means such as the hydraulic actuating unit indicated generally by the reference numeral 28. Of course, this actuating unit, shown in section in Fig. 5, is at the same time an automatic control unit. It is mounted on web 27 and consists of hydraulic cylinder 29 in which piston 30 is slidable. This piston 30 is provided with a piston rod 31 which passes through the end wall of cylinder 29 and is secured to sleeve 25, whereby, since unit 28 is rigidly secured to web 27, when pressure is exerted in cylinder 29, piston 30 moves outwardly of the cylinder to move sleeve 25 and the connected sleeve 24 longitudinally of the transmission. Thus, piston 30 plays the role of a servo-motor; its diameter may also be so chosen as to certainly have on hand the force necessary to bend all the blades to be adjusted; while only one unit 28 is shown in the drawings, a number of them may also be used in this connection.

Spring 32 tends to return piston 30 against pressure in cylinder 29. The hydraulic pressure of the fluid pumped by impeller 3 is conducted to cylinder 29 through means such as pipe 33, passing through sleeve 10 at a point adjacent to impeller 3 and connected via inlet 34 to a second and smaller cylinder 35, provided with free piston 36, and orifice 37 in the wall 38 communicating with cylinder 29. Also slidable in cylinder 35 is a second piston 39 provided with shaft 40 extending through the end wall of the cylinder, while pistons 36 and 39 are spaced apart by spring 41. The fluid pressure in cylinder 29 may be bled off through one of a series of orifices 42 in wall 38, in accordance with the respective positions of pistons 30 and 36, while orifices 43, 43 in the walls of cylinders 29 and 35 maintain the open ends of pistons 30 and 36 at the low pressure of the inlet of impeller 3.

The free extremity of shaft 40 of piston 39 makes frictional contact with an idler ring 44 slidable along the central axis of the transmission unit, as shown, for example, on the inner edge of shell 7 of the pump impeller. Such ring 44 is provided with flange 45 which frictionally engages a tapered skirt 46 on each of a plurality of governor weights 47 which are freely rotatable and slidable on rods 48 secured in shell 7 of the pump impeller, whereby ring 44 normally rides with its flange 45 adjacent to weights 47 due to the pressure of spring 41 between piston 36 and piston 39, integral shaft 40 of piston 39 urging flange 45 against skirts 46 of the governor weights. With the revolution of shaft 2 and the pump impeller, centrifugal force causes governor weights 47 to ride along rods 48 away from the axis of the impeller, causing skirts 46 to bear against flange 45 of ring 44 and to move the ring toward control unit 28.

The operation of the transmission as a whole may be described as follows. When shaft 2 is driven, causing pump impeller 3 to pump the hydraulic liquid through the annular spaces between sleeves 9 and 10 to turbine runner 5 and then back through the annular spaces between sleeves 11 and 12 from the turbine runner, the hydraulic pressure produced at the outer periphery of the pump impeller is transmitted through pipe 33, cylinder 35 and orifice 37 into cylinder 29 of actuating unit 28, moving piston 30 and shaft 31, thus causing connected sleeves 24 and 25 to move toward the pump impeller and causing cam slots 23 to engage cams 22 to rotate disc heads 20 and thereby impart more curve to blades 13 and 14. Simultaneously, the pump pressure, acting on piston 36 against the reaction of spring 41, causes piston 36 to move until it takes a position corresponding to a state of equilibrium between the spring 41 on the one side of this piston 36 and the oil pressure on the other side. Piston 30 must follow the motion of piston 36 to almost close off whichever of orifices 42 happens to be adjacent to the left edge of piston 36. Thus, to any given oil pressure there corresponds a given position of equilibrium of piston 36, this latter defining the position of the servo-motor (composed of piston 29 and piston rod 31).

As the speed of impeller 3 increases, however, centrifugal force moves weights 47 outwardly of impeller 3, and skirts 46 of the weights move ring 44 toward control unit 28, thereby causing shaft 40 and connected piston 39 to compress spring 41 against piston 36, which then may move to uncover more of orifices 42 and to establish an equilibrium in another position of pistons 36 and 30, or which may resist higher pressure on its right side, this higher pressure resulting from the increase in primary speed. The form of skirts 46 is, of course, so chosen as to suit the actual functional dependence between oil pressure and primary speed.

Thus the angles of ends of blades 13 and 14 will always be automatically adjusted to the best angle for maintaining the high torque and power transmission efficiency in the unit in accordance both with the relative speeds of the two rotors and with the absolute speed of the pump impeller.

While I have described and illustrated one embodiment of my improved power transmission, it is to be understood that such disclosure is purely for the purpose of illustration, and is intended to impose no limitations on the scope of my invention beyond those set forth in the appended claim.

What I claim as my invention is:

A rotary hydraulic torque converter including a housing; a drive shaft entering one end of said housing; an impeller rigidly secured to said drive shaft at a point within the housing; a driven shaft leaving the other end of said housing, said drive shaft and driven shafts being axially aligned; a turbine rigidly secured to said driven shaft, said impeller and turbine being of similar hemi-toroidal shape and longitudinally spaced apart within said housing; four sleeves rigidly mounted within said casing between said impeller and said turbine, said sleeves being arranged in pairs to form two annular passageways, one connecting the impeller outlet and the turbine inlet, the other connecting the turbine outlet and the impeller inlet; a plurality of blade elements mounted in each of said annular passageways, each of said blade elements having a rigid central portion fixed to the sleeves which form the passageways and flexible end portions; a web extending centrally between the pairs of sleeves which form the passageways; an hydraulic cylinder mounted by said web; a piston and a piston rod in said cylinder; a conduit for hydraulic fluid leading from said first mentioned passageway, at a point adjacent said impeller outlet, to said cylinder; a pair of cam sleeves slidably mounted between the sleeves forming said passageways, the cam sleeves being disposed on opposite sides of said web and the cylinder carried thereby, said cam sleeves being tied together so that movement imparted to one is also applied to the other, said piston rod being connected to one of said cam sleeves; cam slots in said cam sleeves; cams mounted in said sleeves forming said annular passageways, said cams being actuable by said cam slots to bend the flexible portions of said blades in said passageways whenever changes in the pressure of fluid directed to said cylinder imparts movement to said piston thereby moving said piston rod and said pair of cam sleeves, the pressure of said fluid being responsive to the speeds of said drive shaft and said driven shaft; and additional means responsive directly to the speed of said drive shaft for varying the influence upon said piston of pressure fluid fed through said conduit.

BOLESLAW SZCZENIOWSKI.

REFERENCES CITED

The following references are of record in the file of this patent:

UNITED STATES PATENTS

| Number | Name | Date |
|---|---|---|
| 2,162,543 | Banner | June 13, 1939 |
| 2,168,862 | Sensaud de Lavaud | Aug. 8, 1939 |
| 2,205,794 | Jandasek | June 25, 1940 |
| 2,327,647 | Jandasek | Aug. 24, 1943 |